United States Patent [19]

Blackington

[11] 4,376,566
[45] Mar. 15, 1983

[54] FIBER OPTIC SWITCHING METHOD AND APPARATUS WITH FLEXIBLE SHUTTER

[75] Inventor: Paul A. Blackington, Vandling, Pa.

[73] Assignee: Sheltered Workshop for the Disabled, Inc., Binghamton, N.Y.

[21] Appl. No.: 323,531

[22] Filed: Nov. 20, 1981

Related U.S. Application Data

[63] Continuation-in-part of Ser. No. 126,178, Mar. 3, 1980, abandoned.

[51] Int. Cl.³ .............................................. G02B 5/14
[52] U.S. Cl. .................................. 350/96.2; 250/227
[58] Field of Search .......................... 350/96.2, 96.15; 250/227

[56] References Cited

U.S. PATENT DOCUMENTS 4,057,719 11/1977 Lewis ................................. 350/96.2
4,170,731 10/1979 Howell et al. .................... 350/96.2

Primary Examiner—David K. Moore
Attorney, Agent, or Firm—Richard G. Stephens

[57] ABSTRACT

An extremely thin shutter is moved into and out of the space between closely-spaced ends of a pair of axially and angularly aligned optic fibers to prevent or establish transmission of light between the fibers. In one embodiment a cantilever shutter is rotated between two positions. In another embodiment a taut band-like shutter having an aperture is translated between two positions.

12 Claims, 14 Drawing Figures

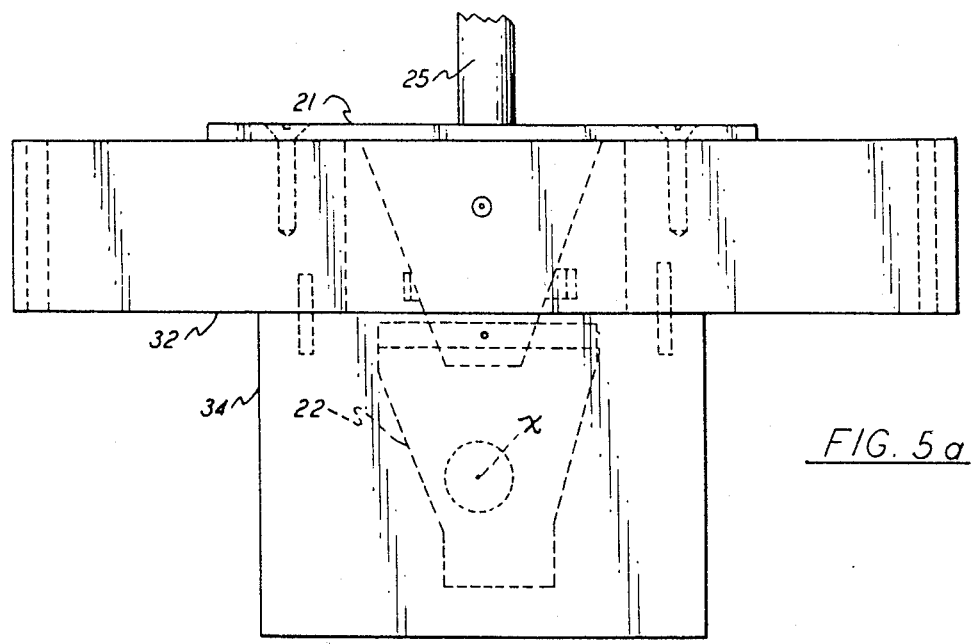
FIG. 5a
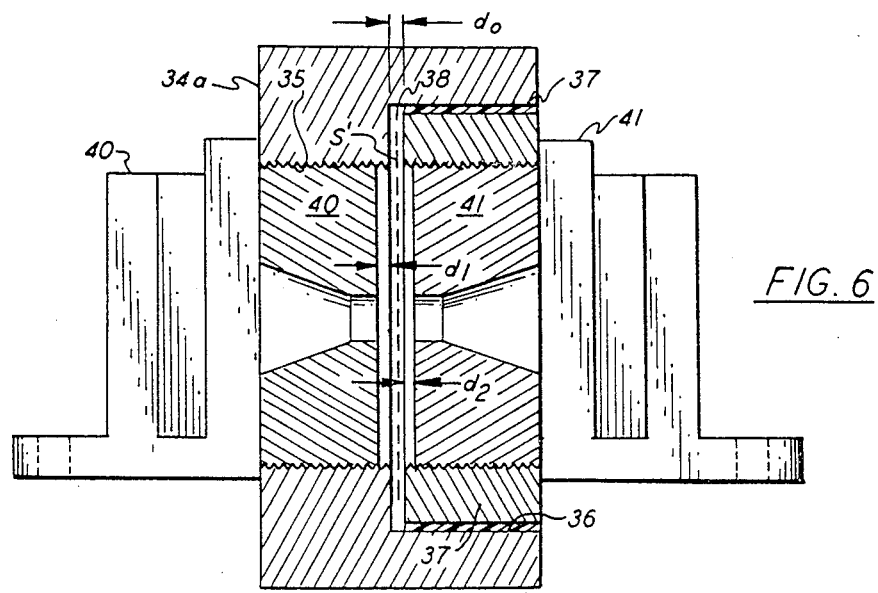
FIG. 6
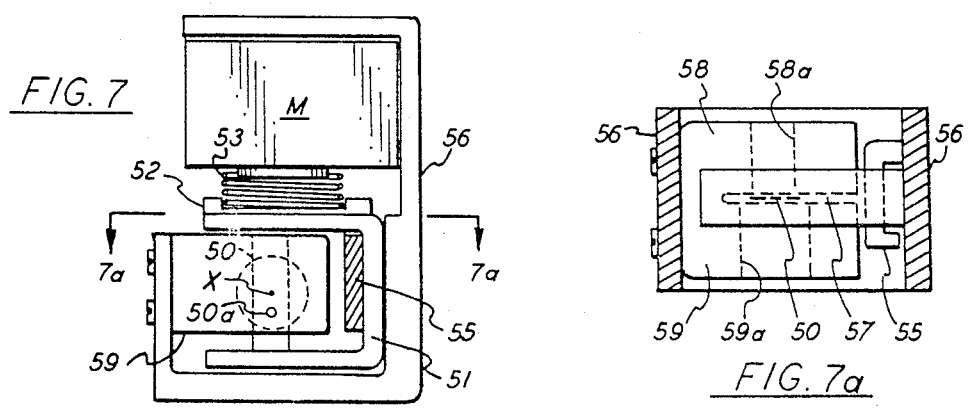
FIG. 7
FIG. 7a

FIBER OPTIC SWITCHING METHOD AND APPARATUS WITH FLEXIBLE SHUTTER

This application is a continuation-in-part of my prior copending Application Ser. No. 126,178 filed Mar. 3, 1980 and now abandoned. This invention relates to fiber optic switches, i.e. devices for selectively allowing and interrupting passage of light between a pair of ends of two optic fibers.

OBJECTS OF THE INVENTION

It is desirable in most applications that a fiber optic switch pass light out an end of one fiber into an end of another fiber with minimum light loss when the switch is in its conducting condition, or "on", and further desirable that passage of light be interrupted or prevented as completely as possible when the switch is in its non-conducting condition, or "off". One general object of the invention is to provide light switching method and apparatus having both low loss during the "on" condition and low leakage during the "off" condition.

Various switches have been proposed wherein switching of light is done by physically moving the end of one fiber relative to the stationary end of the other fiber, flexing the first fiber to the extent necessary. To operate with low loss in their "on" condition, such switches must incorporate very precise mechanisms which can faithfully and repeatedly re-position the movable fiber end relative to the fixed fiber end with very small axial and angular mis-alignments. Providing such mechanisms presents difficulties. If fixed stops are provided to determine movement of the movable fiber end, such stops must be cut with great precision, and the wear of such stops after long usage tends to increase light loss. If adjustable stops are used instead, manufacturing tolerances need not be as critical, but adjustment tends to be tedious and time-consuming, and it undesirably requires the use of laboratory equipment. Wear of adjustable stops also tends to cause light loss. One object of the present invention is to overcome such problems which occur by moving a fiber end to accomplish switching. Thus one object of the present invention is to provide improved method and apparatus for switching light between two fiber ends wherein both fiber ends are held stationary. Another object of the invention is to provide light switching apparatus in which light loss during the "on" condition is not dependent upon any mechanism moving to an extremely precise position, so that any of a wide variety of known switch-actuator mechanisms having limited positioning precision may be used.

The broad principle of having both fiber ends stationary is not per se new, and a light switching device having that feature is shown in U.S. Pat. No. 4,023,887 (Speers). In the device suggested by Speers light conduction from the input fiber to the output fiber is established by rotating a disc carrying a short section of light-transmissive fiber, to interpose the short section in between the input fiber end and the output fiber end. While such an arrangement may be useful for some applications, it tends to be unsatisfactory if very low loss is required, principally because two light interfaces are required. Losses occur as light exits from the input fiber end into the short section, and further losses occur as light passes from the short section into the output fiber end. Further small losses can occur within the short section. Wear or play in the bearings which support the disc can cause axial and angular alignments which also cause loss. Another object of the present invention is to provide improved light switching method and apparatus for switching light between two stationary fiber ends wherein only a single light interface exists between the fiber ends during the "on" condition.

In accordance with one form of the present invention, an opaque shutter formed from very thin sheet material is arranged to swing between two alternate positions, in one of which a portion of the shutter lies between the two fiber ends, preventing passage of light, and in the other of which no portion of the shutter lies between the two fiber ends, so that light may pass from the input fiber to the output fiber. Forming the shutter of extremely thin opaque sheet material allows the two fiber ends to be mounted with a very small separation between them, which is extremely important in order to minimize light loss, but it makes the shutter very flexible, potentially making it extremely difficult to insert and remove a shutter portion from a space between the two fiber ends without having the shutter either abrade the end face of a fiber or jam against a fiber instead of entering between the two fiber ends. In accordance with a further feature of one embodiment of the invention, the fiber ends are fixed in a block which is provided with a track or slot in which portions of the flexible shutter may slide and be guided to avoid having the shutter strike either fiber end.

Another object of the invention is to provide light-switching apparatus which is simple and economical to construct, and capable of long use.

Other objects of the invention will in part be obvious and will in part appear hereinafter.

The invention accordingly comprises the features of construction, combination of elements, and arrangement of parts, which will be exemplified in the construction hereinafter set forth, and the scope of the invention will be indicated in the claims.

For a fuller understanding of the nature and objects of the invention reference should be had to the following detailed description taken in connection with the accompanying drawings, in which:

FIG. 5a is a side view of the assembled apparatus.

FIG. 6 is a greatly enlarged view of portions of the shutter cavity showing a pair of conventional fiber optic connections installed therein.

FIG. 7 is a side elevation view of one alternative embodiment of the invention.

FIG. 7a is a section view taken at lines 7a—7a in FIG. 7.

Figure 1:
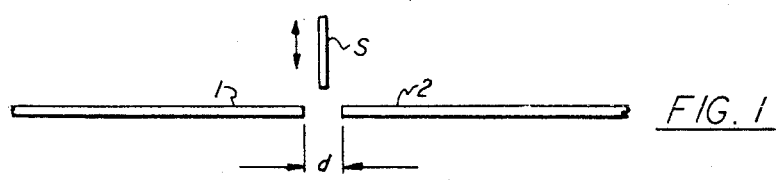
FIG. 1 is a diagram useful in understanding some basic principles of the invention.

Referring to FIG. 1 a pair of cylindrical optical fibers 1, 2 which may be plastic or glass are shown fixedly located relative to each other with a small separation distance d between their ends. The fibers are assumed to be axially and angularly aligned with each other. Light exits from the end of fiber 1 in a cone-shaped pattern having a spread dependent upon the numerical aperture of the fibers. As distance d is increased, decreasing amounts of the conical pattern of light are intercepted by fiber 2, causing greater light loss during the "on" condition when shutter S is not interposed between the ends of the fibers. Thus for minimum light loss during the "on" condition the fiber ends should be very close together, ideally touching each other. However, unless an appreciable separation exists between the fiber ends, there is not enough room to insert shutter S between the fiber ends in order to prevent light transmission when that is desired. In numerous applications it is desirable to use optical fibers of quite small diameters, such as diameters of 2 mils to 56 mils (0.0508 mm. to 1.422 mm.), for example. The smaller the diameter of the fibers, the greater the light loss which results from a given separation distance d. In accordance with the invention, a very small separation distance (e.g. 3 mils or 0.076 mm.) is provided between the fiber ends to minimize light loss during the "on" condition, and a very thin opaque shutter is moved in and out of the space between the fiber ends. The shutter preferably comprises a piece of steel sheet having a thickness of about 1 mil (0.0254 mm.), though brass or beryllium copper sheet could instead be used. Metal sheet is preferred because of its resistance to wear. Metal sheet having such a thickness tends to be quite flexible, potentially making it quite difficult mechanically to insert and remove a piece of such sheet into and from the space between fiber ends having such a small separation without having the sheet either abrade a polished fiber end or jam against the side of a fiber. In a form of the invention illustrated in FIGS. 2-6, a track is provided to guide a thin cantilever-mounted shutter as it is rotated in and out of the space between the fiber ends, and the fiber ends are slightly recessed from the space in which the track allows the shutter to move, preventing the flexible shutter from engaging either fiber end. In another embodiment, though the thin shutter is itself flexible, opposite edges of the shutter are gripped to hold it taut as it is moved to insert or remove an aperture in the shutter from the space between the fiber ends.

Figure 2A:
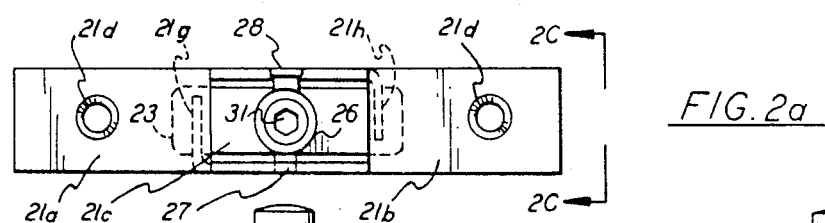
FIGS. 2a, 2b and 2c are top, side elevation and end views of an exemplary shutter-rotating mechanism used with one embodiment of the invention.
Figure 2B:
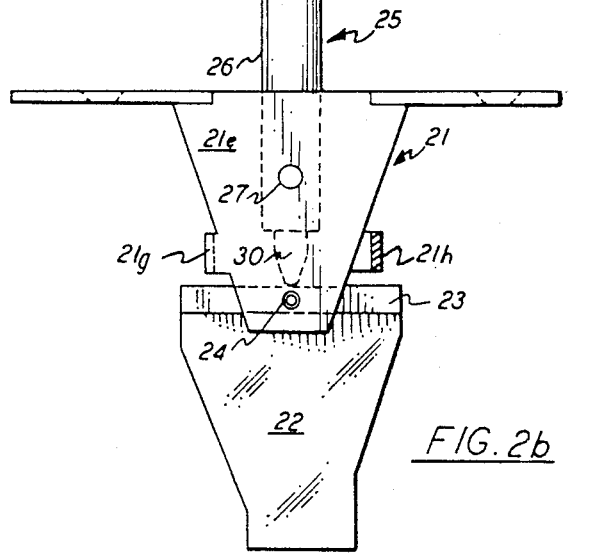
Figure 2C:
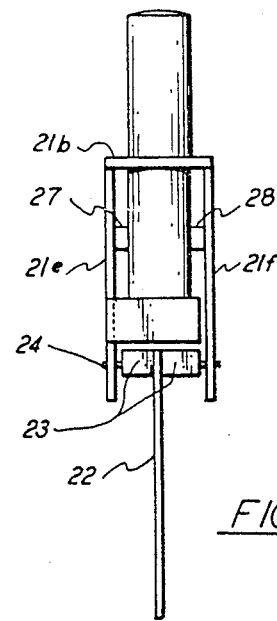

In FIGS. 2a, 2b and 2c one exemplary shutter pivoting mechanism is shown as comprising a frame 21 having upper plate portions 21a and 21b, an opening 21c and two mounting holes 21d, 21d, and a pair of side legs 21e, 21f depending from the upper plate portions to form a generally U-shaped frame. The thin membrane shutter 22 is sandwiched between and cemented to a pair of blocks 23, 23 to form a shutter mount. Pin 24 rotatably passes through holes through blocks 23, 23 and the shutter, and the ends of pin 24 are secured in respective holes in legs 21e and 21f. Actuating arm 25 comprises a hollow cylinder 26 which is pivotally mounted between side legs 21e, 21f on stub shafts 27, 28. Cylinder 26 slidably carries a plunger 30, and a coil spring (not shown) inside cylinder 26 urges the rounded end of plunger 30 against the top surface of the shutter mount. A set screw 31 in the upper end of cylinder 26 allows the spring pressure on plunger 30 to be adjusted. The mechanism is shown in FIGS. 2a, 2b and 2c in an unstable centered position in which the force exerted on the shutter mount is directed precisely toward the axis of pin 24. If the actuating arm is pivoted in one direction or another from that centered position, it will be apparent that the plunger force will be applied to one side or another of pin 24, causing rotation of the shutter mount and shutter membrane about the axis of pin 24, until an upper edge of the shutter mount strikes stop tab portion 21g of leg 21e or stop tab portion 21h of leg 21f. Thus movement of actuating arm 25 in either direction through the centered condition shown snaps the shutter from one predetermined angular or pivotal position to another predetermined angular or pivotal position. The actuating arm will be rotated by the spring force until cylinder 26 strikes one edge or another of opening 21c. It is to be clearly understood that the particular shutter pivoting mechanism shown in FIGS. 2a-2c is exemplary only. A wide variety of mechanisms are known for pivoting electrical switch blades between two angular positions, and many of them can be modified to similarly pivot a thin shutter without the exercise of invention.

The shutter 22 comprises steel sheet of 1 mil (0.0254 mm.) thickness, and having that thickness it tends to be somewhat flexible. It is shown mounted in cantilever fashion, i.e. gripped only along one edge.

Figure 3A:
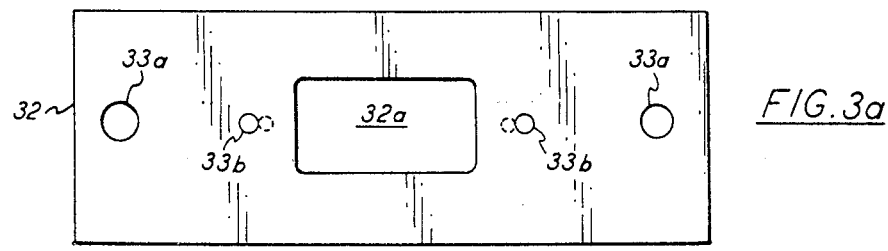
FIGS. 3a and 3b are top and side elevation views of a mounting block portion of the same embodiment of the invention.
Figure 3B:
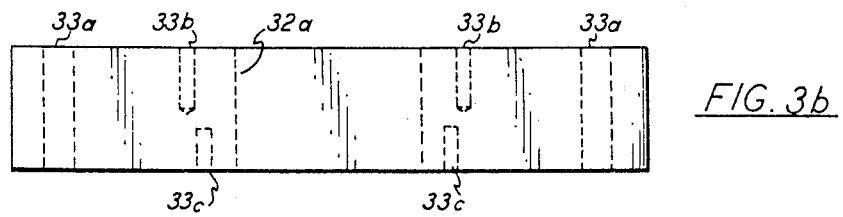
Figure 5:
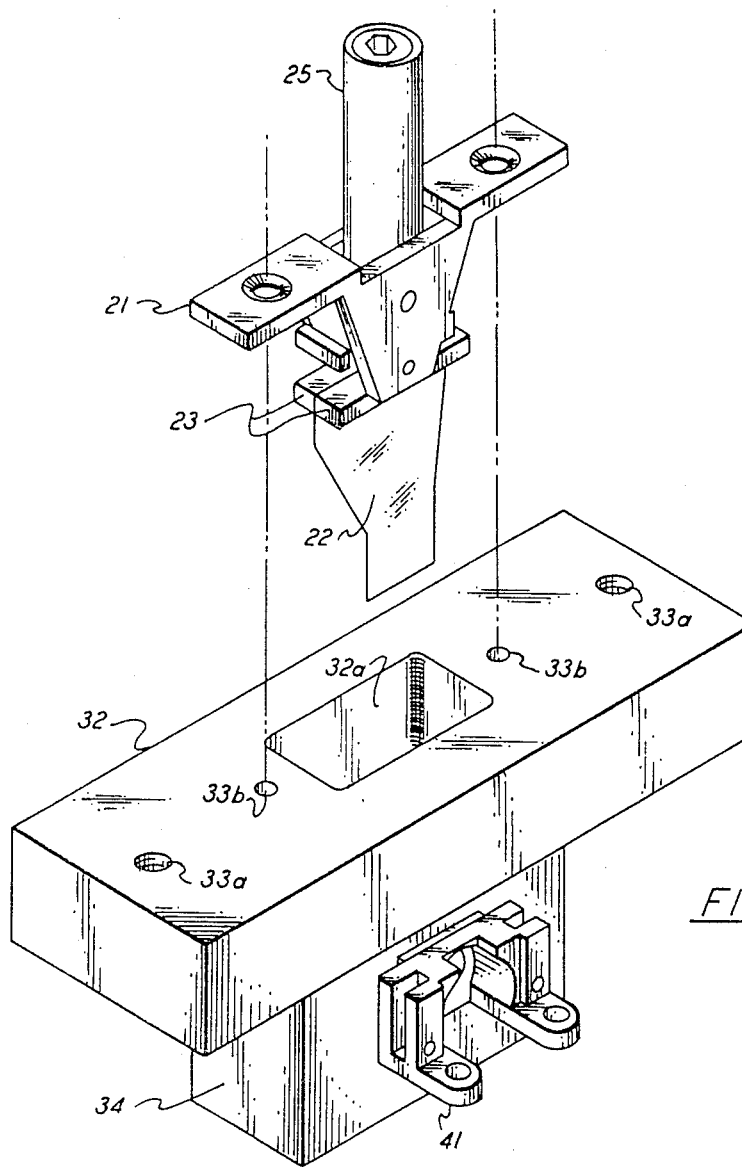
FIG. 5 is an exploded isometric view illustrating how the apparatus of FIGS. 2a–2c, 3a, 3b and 4a–4c may be assembled.

In FIGS. 3a and 3b a mounting block is shown as comprising a rectangular block 32 preferably formed of aluminum, having a central, rectangular hole or through-passage 32a. A pair of threaded holes 33a, 33a allow block 32 to be affixed to a standard electrical switch plate (not shown). A pair of threaded holes 33b, 33b allow frame 21 of the shutter-pivoting assembly to be affixed to block 32 via holes 21d, 21d (FIG. 2a). A pair of holes 33c, 33c receive pins (not shown in FIGS. 3a, 3b) which serve to locate a switch cavity block on mounting block 32.

Figure 4A:
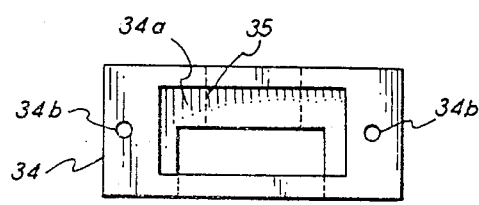
FIGS. 4a, 4b and 4c are top, side elevation, and cross-section views of a shutter cavity portion of the same embodiment of the invention.
Figure 4B:
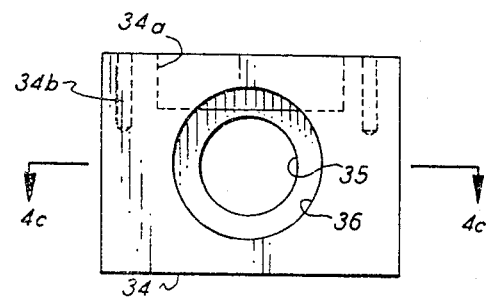
Figure 4C:
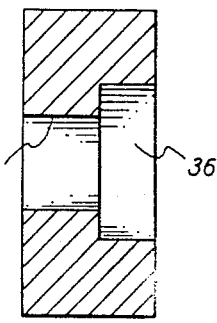

The switch cavity block 34 is shown in FIGS. 4a, 4b and 4c as a generally-rectangular block, also preferably formed of aluminum, having an upper rectangular recess 34a. Holes 34b, 34b in block 34 receive pins (not shown) which also seat in holes 33c, 33c (FIG. 3b), so that recess 34a of block 34 registers with the similar size opening 32a through mounting block 32. A first cylindrical threaded bore 35 extending partway through block 35 is concentric with and communicates with a larger unthreaded cylindrical bore 36 which extends the rest of the way through block 34. Bore 36 has a diameter such that it intersects rectangular recess 34a. A conventional fiber optic connector 40 (FIG. 6) is threaded into bore 35 and cemented in place, and another conventional connector 41 is installed in a bore 36 using a cylindrical bushing 37 (FIG. 6) in a manner to be described. As is evident from FIGS. 5 and 5a, the shutter pivoting mechanism is lowered to seat atop mounting block 32, with the thin shutter 22 being lowered through opening 32 to reside within switch cavity block 34. The shutter 22 is again shown in an unstable centered condition in FIG. 5a. It will be understood that in one stable position the shutter completely covers the fiber optical axis (shown at x in FIG. 5a), and that in its other stable position it does not.

FIG. 6 is an enlarged view looking down into recess 34a of block 34, with a cylindrical bushing 37 shown cemented in bore 36. Bushing 37 has a threaded central bore 37a in which a conventional optic fiber connector 41 is threaded and cemented. A narrow gap space 38 approximately 2 mils (0.051 mm.) in width shown greatly exaggerated in FIG. 5 exists between one side of bushing 37 and the end of bore 36, providing a track along which thin membrane shutter 22 may move. The path along which shutter 22 moves is shown by dashed line S' in FIG. 6. The left (in FIG. 6) edge or face of bushing 37 is spaced 2 mils (0.051 mm.) from the end of bore 36 by temporarily placing 2 mil shim stock (not shown) between those parts while the cement which affixes the bushing in bore 36 hardens. A cylindrical rod (not shown) is also extended through the two connectors while the cement hardens, to insure that the connectors will eventually be aligned axially and angularly. If gap 38 has a width of 2 mils (0.051 mm.) and shutter 22 has a thickness of 1 mil (0.0254 mm.), it will be apparent that shutter 22 theoretically could pivot within the gap with a half-mil (0.013 mm.) clearance on each side, if the shutter were perfectly flat and rigid. In practice, portions of the shutter slide against the end of bore 36 and the face of bushing 37, but those surfaces greatly limit the axial positions which any portions of the shutter may take. In order to prevent any portion of the shutter from rubbing on a fiber end, each fiber optic connector is arranged to locate the end of its respective fiber a very small distance (e.g. 0.0005 inch, or 0.013 mm.) from an edge of the gap. Thus if gap 38 has an axial width of 2 mils (0.051 mm.), the polished ends of the two fibers may be an axial distance of 3 mils (0.076 mm.) from each other. In FIG. 6 the polished fiber ends are shown located distances $d_1$ and $d_2$, respectively, from the gap 38 of width $d_o$. Using such a fiber end separation, with fibers 5 mils (0.127 mm.) in diameter a light loss of about 6 db. was achieved, and with fibers 56 mils (1.42 mm.) in diameter, a loss of about 0.1 db. was obtained. Even if shutter 22 comprises such a thin steel sheet and is therefore flexible, it can move back and forth in the track without striking the end of either optical fiber, the bottom edge of bore 36 and the face of bushing 37 spaced slightly therefrom acting as guide surfaces against which the shutter may slide.

While the shutter moving mechanism has been shown as comprising a toggle-type, manually operated device which rotates a shutter, it is within the scope of the invention to provide switches wherein shutter motion is momentary rather than toggled, switches wherein shutter motion is provided by electrically, as by means of electromagnetic actuators, and switches in which a thin shutter is translated rather than rotated.

In another embodiment of light switch illustrated in FIGS. 7 and 7a, an extremely thin opaque shutter comprises a strip or band of metal sheet 50 held at its opposite ends by legs of a U-shaped member 51 which maintains the band taut. The band is generally opaque but includes a hole 50a. A ferromagnetic piece 52 affixed to the U-shaped member is pulled upwardly against the force of compression spring 53 when an electromagnet M is energized, locating the aperture in band 50 concentric with a pair of fiber ends, the axes of which are shown at x in FIG. 7a. Upon de-energization of the electromagnet, the U-shaped member and band are returned to the position shown, so that the band prevents transmission of light between the fiber ends. A tab 55 on frame 56 guides upward and downward movement of the U-shaped element. The band 50 rides in a thin slot 57 between a pair of block members 58, 59 carried on frame 56. Block member 58 includes a threaded opening 58a, and block member 59 includes an unthreaded bore 59a. A pair of fiber optic connectors (not shown) are mounted in bores 58a and 59a in the same manner as was described above in connection with FIG. 6.

While metal sheet is presently preferred as shutter material, it is believed that various plastic sheets may be substituted to provide equivalent operation.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawings shall be interpreted as illustrative and not in a limiting sense.

The embodiments of the invention in which an exclusive property or privilege is claimed are defined as follows:

1. Apparatus for selectively establishing and preventing light transmission between first and second optical fibers, comprising, in combination: a support member having first and second recesses adapted to receive respective optic fiber connectors to fixedly space the ends of said fibers in axial and angular alignment with each other and with an air space between the ends of said fibers; an opaque flexible planar shutter having a thickness less than the width of said air space; means for moving said shutter between a first position in which a portion of said shutter completely intersects said air space between the ends of said fibers to prevent light transmission between said ends and a second position in which no portion of said shutter is interposed in said air space; and means for constraining movement of said portion of said shutter to a plane substantially perpendicular to the axes of said fibers.

2. Apparatus according to claim 1 wherein the width of said space is less then the diameter of said optic fibers.

3. Apparatus according to claim 1 wherein said means for constraining movement comprises a pair of surfaces on said support member limiting axial movement of said flexible planar shutter.

4. Apparatus according to claim 1 wherein said shutter comprises a thin piece of metal sheet.

5. Apparatus according to claim 1 wherein said means for moving comprises means for pivoting said shutter about a predetermined axis parallel to the axes of said ends of said fibers.

6. Apparatus according to claim 1 wherein said means for moving comprises means for translating said shutter.

7. Apparatus according to claim 1 wherein said shutter comprises a thin piece of sheet attached at one edge to said means for moving.

8. Apparatus according to claim 1 wherein said shutter comprises a thin piece of flexible sheet and said apparatus comprises means engaging opposite sides of said piece of sheet to maintain said piece taut.

9. Apparatus according to claim 1 wherein said shutter has a thickness less than 0.005 inch (0.127 mm.).

10. Apparatus according to claim 1 wherein said means for moving comprises a manually-operable member operable to toggle said shutter between said first and second positions.

11. Apparatus according to claim 1 wherein said means for moving comprises an electromagnet.

12. Apparatus according to claim 3 wherein said block member spaces apart said optic fiber connectors at a distance such that said surfaces are in between said ends of said fibers.

* * * * *